June 6, 1961 K. W. MacKENZIE 2,987,319
GOLF TRAINING DEVICE
Filed June 19, 1958 2 Sheets-Sheet 1
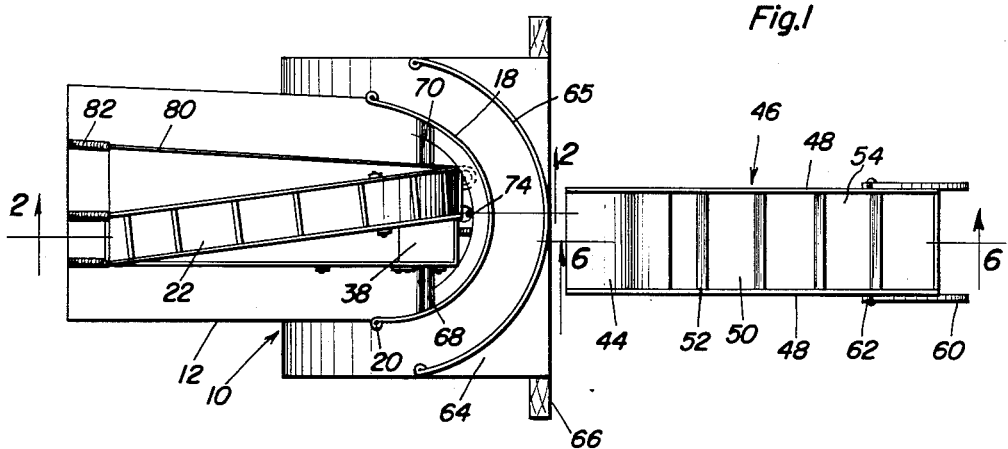
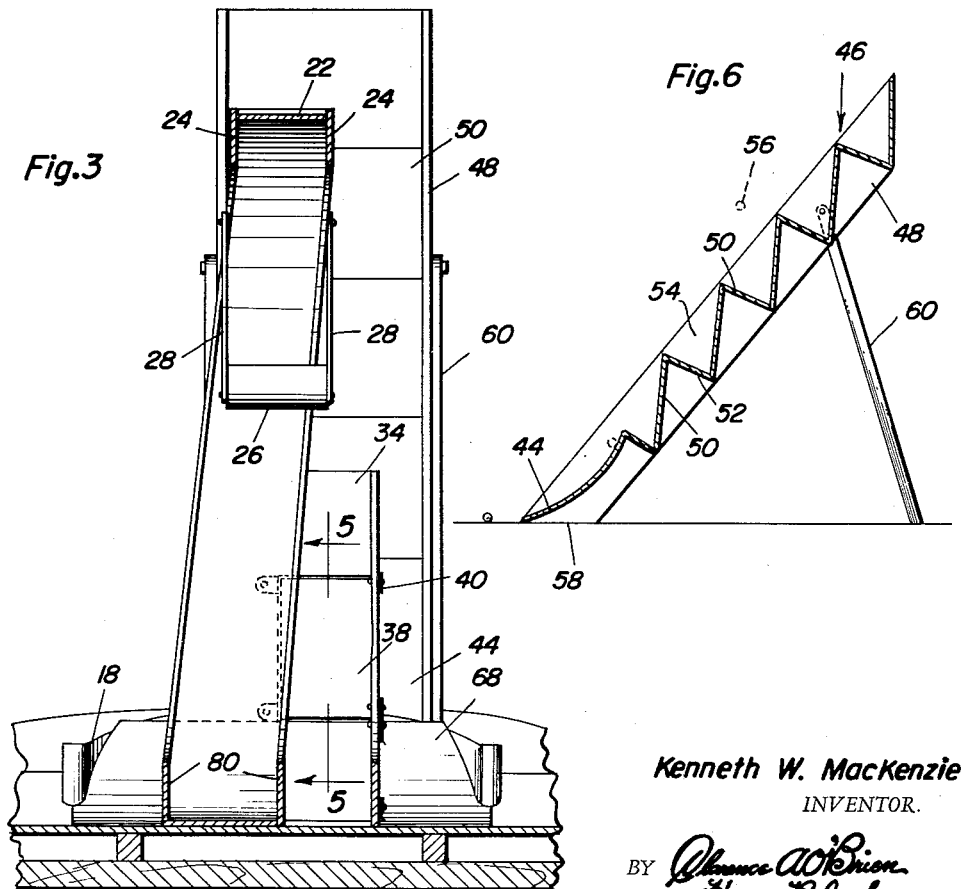
Kenneth W. MacKenzie
INVENTOR.

June 6, 1961 K. W. MacKENZIE 2,987,319
GOLF TRAINING DEVICE
Filed June 19, 1958 2 Sheets-Sheet 2
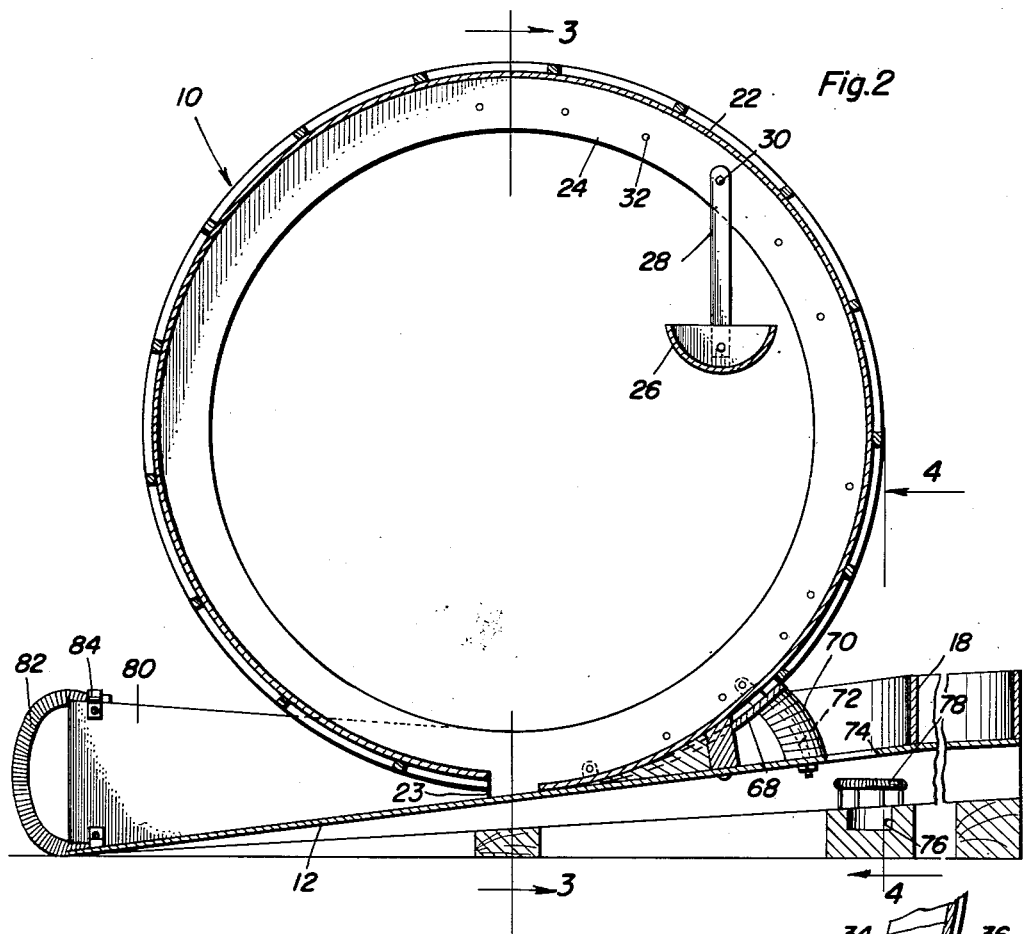
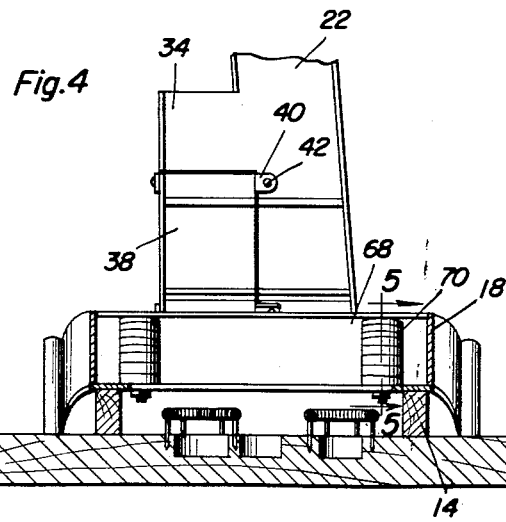
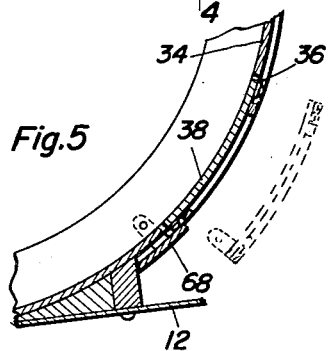
Kenneth W. MacKenzie
INVENTOR.

United States Patent Office 2,987,319
Patented June 6, 1961

2,987,319
GOLF TRAINING DEVICE
Kenneth W. MacKenzie, San Jose, Calif.
(Rte. 3, Box 412C, Acampo, Calif.)
Filed June 19, 1958, Ser. No. 743,035
3 Claims. (Cl. 273—180)

The present invention generally relates to a training aid and more particularly to a device for assisting in training and teaching student golfers in the art of hitting golf balls in a desired manner.

An object of the present invention is to provide a training device for training persons in the desired manner of hitting golf balls but which may be used for other purposes such as a game device with which interesting games may be played by following certain rules.

The present invention incorporates in its construction an inclined ramp together with a loop around which a golf ball may pass in combination with an inclined ladder having a series of pockets into which the golf ball may be projected with there also being other features which permit the ball to travel in one of several manners after the same has been hit.

A further object of the present invention is to provide a golf training device which is adapted for training of various types of shots and further is simple in construction, easy to use, well adapted for its intended purposes and relatively inexpensive to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a plan view of the golf training device of the present invention;

FIGURE 2 is a longitudinal, sectional view taken substantially upon a plane passing along section line 2—2 of FIGURE 1;

FIGURE 3 is a vertical sectional view taken substantially upon a plane passing along section line 3—3 of FIGURE 2 and looking in the direction of the arrows;

FIGURE 4 is a detailed sectional view taken substantially upon a plane passing along section line 4—4 of FIGURE 2 and looking in the direction of the arrows;

FIGURE 5 is a detailed sectional view taken substantially upon a plane passing along section line 5—5 of FIGURE 3; and FIGURE 6 is a longitudinal sectional view taken substantially upon a plane passing along section line 6—6 of FIGURE 1 illustrating the inclined ladder construction.

Referring now specifically to the drawings, the numeral 10 generally designates the golf training device of the present invention which includes an inclined ramp 12 in the form substantially of a flat board having longitudinal supporting members 14 and transverse supporting members 16 which cooperate to form a support for the inclined ramp 12. Adjacent one end of the ramp there is provided an upstanding rounded wall 18 having rounded ends 20. Mounted on the ramp 12 by any suitable fasteners is a cylindrical loop 22 having a peripheral wall with inwardly extending side edges or walls 24 for removably supporting a plurality of receptacles 26 from pairs of supporting brackets 28. The lower end of the loop 22 is offset slightly to the left and continuous with the ramp 12 whereby a golf ball may be driven into the offset open lower end of the loop and subsequently pass around the interior of the loop and drop into the pocket or receptacle 26 when the momentum of the ball is expended for indicating generally the force exerted on the ball when driven. The brackets 28 are pivotally supported by support pins 30 which extend through selective apertures 22 in the peripheral inwardly extending walls 24 thus providing variation in the position of the pocket 26. The terminal end of the loop 22 is spaced above the ramp 12 thus providing for return of the ball down the ramp 12 to the original starting position in the event the ball does not enter the loop but engages wall 18. A partial loop is provided alongside of the loop 22 and is designated by the numeral 34 with the lower end merging with ramp 12 and includes an opening 36 therein having a removable closure plate 38 mounted therein by attaching lugs 40 and screw threaded fasteners 42 or equivalent fastening means. By driving the ball up the ramp 34 and through the opening 36, the ball will engage a curved ramp 44 of an elongated ladder generally designated by the numeral 46 and including a pair of side walls 48 held in spaced relation by a plurality of transverse members 50 which are disposed in spaced parallel relation to each other and which incline towards the upper end thereof with the members 50 being connected with transverse members 52 which are inclined downwardly and towards the free end of the ladder thus defining a series of spaced pockets 54 for receiving golf balls 56 therein. The bottom end of the side walls 48 are beveled as indicated by the numeral 58 for engaging a supporting surface and the upper end of the side walls 48 are supported by pivotal legs 60 secured to the side members by pivoted fasteners 62.

Disposed adjacent the portion of the ramp 12 having the curved wall 18 thereon is an enlarged ramp 64 extending transversely outwardly of a portion of ramp 12 and supported at its forward end by a transverse support member 66 which serves to return golf balls back to the initial point of impact. Also, the end of the ramp 12 having wall 18 is provided with an upwardly curved transversely extending bottom portion 68 which is adjustably supported by a plurality of apertured wedge-shaped members 70 having an arcuately curved bolt 72 extending therethrough thus joining the curved portion 68 with the ramp 64. Disposed outwardly of the free end of the upwardly curved portion 68 and inwardly of wall 18 is a series of apertures 74 in ramp 12 having pockets 76 disposed therebelow with the pockets being surrounded by an encircling spring member 78 whereby golf balls proceeding over the upwardly curved portion 68 may be deposited into the pockets 76. The entrance to the loop 22 and the partial loop 34 is defined by upstanding walls 80 which form continuations of the peripheral walls 24 and the ends of these walls 80 are each provided with a longitudinally extending U-shaped resilient member 82 secured to the wall 80 by clips 84 with members 82 preventing driven golf balls from engaging the ends of the walls 80.

In operation, the ramp and loop are employed with the side edges of the ramp 12 used for putting into cups 76. If a ball misses going out exit door 38 and does not drop into a bucket 26, it rolls through space 23 shown at the bottom of the loop and back down ramp 12 towards the person that struck the ball for re-use. The pegs which hold spring 78 are removable and a duplicate set or the removed set may be mounted on ramp or incline 12 in encircling relation to hole 74 for putting over the curved portion 68 into holes 74. The enlarged ramp 64 is also provided with an upstanding curved wall 65 similar to 18 to send balls into cups or back to the golfer if the ball misses ramp 12. If balls are hit harder they may enter ladder pockets or more distant ground pockets when the loop 22 is removed and the curved surface 68 is used.

This develops skill in striking a golf ball since the ball 56 must be struck just hard enough to clear outlet opening 36 but yet drop into the pockets 54. The same is true of the suspended buckets 26 or the ladder pockets 54. Rim shots may also be developed by employing the semi-circular walls 18 and 65 on the ramps 12 and 64 and the loop 22 may be completely removed if desired. An important feature of this invention is to hit the ball hard with the loop acting as a brake or retarder for the ball. Also the top edge of the upwardly curved portion 68 may be varied so that the trajectory of the ball as it leaves the ramp 12 may be varied. Various games and scoring arrangements may be provided for developing skills or for entertainment purposes.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A golf training device comprising an inclined ramp, a loop disposed vertically and having an entrance end forming a continuation of the ramp for receiving a golf ball from the ramp and an exit end disposed laterally of the entrance end and above the ramp, said loop including a peripheral wall and inwardly extending side walls, and a receptacle mounted in depending relation to the side walls and forming a target for golf balls driven into and around said loop.

2. The combination of claim 1 wherein said inclined ramp extends laterally of the loop and includes a curved wall for returning golf balls to the starting area in the event the golf balls miss the loop.

3. The combination of claim 2 wherein an inclined ladder-like device is supported adjacent the discharge end of the ramp, said ladder having a series of spaced pockets therein for receiving golf balls, an upwardly curved surface mounted on the lower end of the ladder, the upper end of the curved surface connected with the lowermost pocket whereby golf balls engaging the curved surface will be deflected upwardly into one of the pockets.

References Cited in the file of this patent

UNITED STATES PATENTS

| | | |
|---|---|---|
| 1,479,673 | Phelps | Jan. 1, 1924 |
| 1,959,882 | Thomas | May 22, 1934 |
| 2,704,212 | Dunseith | Mar. 15, 1955 |